United States Patent Office 2,761,315
Patented Sept. 4, 1956

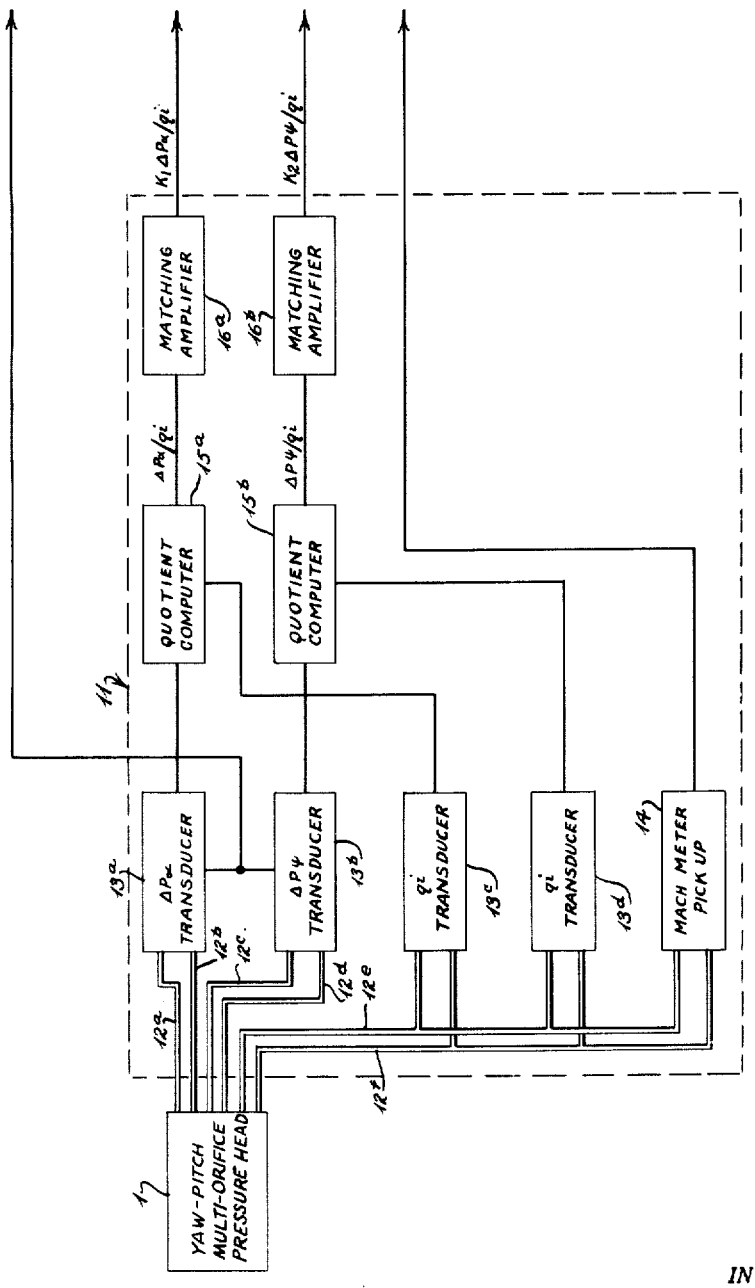

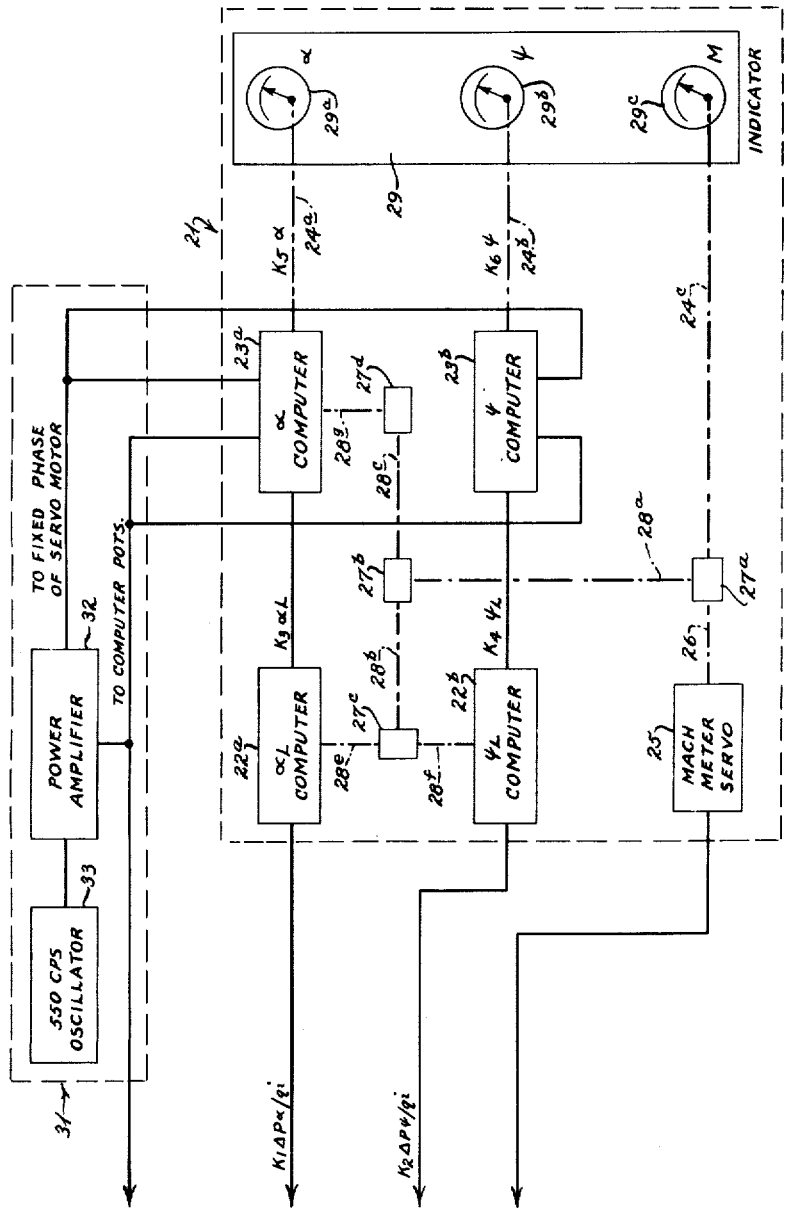

2,761,315
FLIGHT LINE COMPUTER SYSTEM

Niels Y. Anderson, Jr., Buffalo, William Maurice Kaushagen, Kenmore, and Karl D. Swartzel, Snyder, N. Y., assignors, by mesne assignments, to the United States of America as represented by the Secretary of the Navy Application January 13, 1953, Serial No. 330,972

5 Claims. (Cl. 73—180)

This invention relates to an instrument designed to evaluate the velocity vector and Mach number of an aircraft with respect to its surrounding air mass. The instrument consists of a yaw-pitch multi-orifice pressure head mounted externally on the aircraft and three assemblies located at convenient points in the fuselage. The three parameters evaluated by the computer, namely angle of attack, angle of yaw and Mach number are delivered as dial indications or as electrical signals.

In general it is not feasible to locate an angle of attack and yaw sensing element at a point on an aircraft where there is no flow misalignment due to the presence of that aircraft itself. Therefore for accurate evaluation of these angles, a computer is required to make the corrections for flow misalignment or disturbance. These local flow misalignments or disturbances are disturbances in the airstream in the vicinity of the sensing device caused by the motion of the aircraft through the airstream.

Hence, it is an object of this invention to provide an instrument which continuously provides in flight the true angle of attack and yaw, as well as the Mach number.

It is a further object of this invention to provide an instrument which will make corrections for local flow misalignments when determining the angles of attack and yaw.

Another object of this invention is the provision of a pneumatic-electromechanical type of instrument which converts appropriate differential pressures into signals, both visual and electrical which are proportional to the true angles of attack and yaw.

These and other objects and advantages of the instant invention will become more apparent as the following description is read in conjunction with the accompanying drawings wherein:

Fig. 1 is a block diagram of a portion of the apparatus and,

Fig. 1a is a continuation of Fig. 1 showing the remainder of the apparatus.

The complete computer system, exclusive of the basic power supplies, is composed of four major units, the yaw-pitch multi-orifice pressure head shown schematically at 1, and the number one, two and three assemblies shown generally at 11, 21 and 31 respectively.

Yaw-pitch multi-orifice pressure head

The sensing element employed with the computer is a one inch diameter hemispherically ended yaw-pitch multi-orifice pressure head of conventional design. It extends forward from the nose or some other suitable location of the aircraft. This position is determined on the basis of theoretical and experimental data. This multi-orifice pressure head is utilized in obtaining the local angle of attack and the local angle of yaw which shall be designated $\alpha_L$ and $\psi_L$ respectively hereinafter. It may be noted that $\alpha_L$ and $\psi_L$ are directly proportional to $\Delta p\alpha/q_i$ and $\Delta p\psi/q_i$ respectively with a Mach number correction determined experimentally in the wind tunnel, wherein:

$\Delta p\alpha$ = angle of attack port differential pressure
$\Delta p\psi$ = angle of yaw port differential pressure
$q_i$ = indicated dynamic pressure

Number one assembly

The number one assembly indicated generally at 11 is that part of the system which converts the pneumatic output of the multi-orifice pressure head into electrical signals proportional to $\alpha_L$ and $\psi_L$.

Input to the number one assembly is in the form of six pneumatic lines, 12a, 12b, 12c, 12d, 12e, 12f, respectively which convey the pertinent port pressures from the yaw-pitch multi-orifice pressure head to the differential port transducers 13a, 13b, 13c, 13d, respectively as well as to the Mach meter pick up 14. The differential pressure transducers are of a conventional "g" balanced, bellows-actuated strain gauge type employing a cantilever beam. These transducers produce electrical signals proportional to their pneumatic inputs which in this case are $\Delta p\alpha$, $\Delta p\psi$, and $q_i$ respectively.

To obtain signals proportional to $\alpha_L$ and $\psi_L$ requires the evaluation of the value of $\Delta p\alpha/q_i$ and $\Delta p\psi/q_i$. This is done electrically in the quotient computers 15a and 15b respectively. The quotient computers are high gain feedback amplifiers with the $q_i$ transducer output in the negative feedback loop. The outputs of the quotient computers are fed into matching amplifiers 16a and 16b respectively which are designed to work into a 500 ohm line with an output of about 0.2 volt/1°. The outputs of the matching amplifiers 16a and 16b which are respectively proportional to $\Delta p\alpha/q_i$ and $\Delta p\psi/q_i$ are fed into the number two assembly. It may be noted that the angle of attack and angle of yaw channels are identical.

Number two assembly

The number two assembly indicated generally at 21 contains the computing servos that position $\alpha$, 4, and the Mach number (hereinafter referred to as M), shafts 24a, 24b, and 24c respectively in accordance with the signals received from the number one assembly.

The general outline of the operation of the $\alpha$ computer is as follows:

The $\alpha_L$ signal is fed into the $\alpha_L$ computer 22a where a sensitivity correcting potentiometer makes corrections for Mach number effects on the multi-orifice pressure head above $M=0.5$ and delivers a signal to the $\alpha$ computer 23a wherein a servo converts the signal to a shaft position. Nonlinearized potentiometers in computer 23a inherently provide Mach dependent angle correcting signals proportional to $\alpha_L$ and having experimentally determined parameters. The potentiometers have been constructed from information obtained experimentally so that there is built into them the correcting information required. These signals from the quotient computer and from the potentiometer are fed into a sum amplifier within computer 23a the output of which equals the difference between the local and true angles of attack. The difference signal is impressed upon a second servo which by means of a mechanical differential subtracts from the shaft position determined by the $\alpha_L$ servo. It may readily be seen that this subtraction, local angle of attack (local angle of attack—true angle of attack), results in a shaft position equal to the true angle of attack which is transmitted to dial indicaor 29a by shaft 24a.

The yaw channels follow the same principle outlined above, except that there are no Mach effects on $\psi_L$ and thus the computing is less complex and involves only one servo. The output shaft 24b of the $\psi$ computer is connected to dial indicator 29b which gives the $\psi$ reading.

The Mach shaft 26 is driven by a conventional Kollsman servo 25 which has a Mach number range of 0.25 to 1.0. Shaft 26 activates the drive pinion in gear box 27a which has two output shafts, 24c and 28a. The gear ratio in gear box 27a incorporates a correction for the discrepancy between local Mach number and true airplane Mach number. The true airplane Mach number is that of the airplane in relation to the undisturbed air. The local Mach number is that obtained when the air surrounding the aircraft has been disturbed due to the motion of the aircraft in the air mass. The correction factor varies with different aircraft and may be determined for any specific type by known experimental means. Shaft 24c at its opposite end is connected to a dial indicator 29c which gives the M reading. Shaft 28a at its opposite end is connected to the drive pinion in a second gear box 27b which has two output shafts, 28b and 28c respectively. Shaft 28b is connected at its opposite end to a third gear box 27c which has two output shafts 28e and 28f. Shaft 28e is connected to the adjusting arm of the sensitivity correcting potentiometer in the $\alpha_L$ computer while shaft 28f has a similar connection in the $\psi_L$ computer. Shaft 28c is connected at its opposite end to gear box 27d whose output shaft is connected to the adjusting arm of the non-linearized potentiometers in the $\alpha$ computer.

Number three assembly

The number three assembly consists of the fixed phase amplifier 32 for servo motor excitation and the master oscillator unit 33.

The master oscillator unit 33 consists of a parallel "T" 550 C. P. S. oscillator with an RCA Red Top tube for long life and stability. This oscillator is the zero phase reference for the complete computer system. A two-stage, feedback amplifier operates in cascade with this oscillator to supply a 15 volt, 550 C. P. S. zero phase signal into a 500 ohm line. This line feeds the various potentiometer assemblies in the number two unit as well as the strain guage bridges in the pressure transducers.

The fixed phase power amplifier 32 supplies the fixed phase voltage at a 90° phase angle for all the servomotors in the number two unit.

Having thus fully described our invention, what we claim as new is:

1. An apparatus for indicating the true angles of attack and yaw of an aircraft having predetermined aerodynamic characteristics comprising a yaw-pitch multi-orifice pressure head affixed to said aircraft for producing pressures which are equivalent to the true angles of attack and yaw of the aircraft as modified by local disturbances, said local disturbances being caused by the motion of the aircraft through an air mass, computing means coupled to said multi-orifice pressure head for applying a correction factor to said multi-orifice pressure head output which is equivalent to the error caused by the local disturbances, and indicating means coupled to said computing means for indicating the true angles of attack and yaw of the aircraft.

2. An apparatus for indicating the true angles of attack and yaw of an aircraft having predetermined aerodynamic characteristics comprising a yaw-pitch multi-orifice pressure head affixed to said aircraft for producing pressures which are equivalent to the true angles of attack and yaw of the aircraft as modified by the local disturbances at a particular Mach number of the aircraft, said local disturbances being caused by the aircraft displacing the air mass in the vicinity of said multi-orifice pressure head, computing means coupled to said multi-orifice pressure head for applying a correction factor to said multi-orifice pressure head output which is equivalent to the error caused by the local disturbances at the particular Mach number of the aircraft, and indicating means coupled to said computing means for indicating the true angles of attack and yaw of the aircraft.

3. An apparatus for indicating the true angles of attack and yaw of an aircraft having predetermined aerodynamic characteristics comprising a yaw-pitch multi-orifice pressure head affixed to said aircraft for producing pressures which are equivalent to the true angles of attack and yaw of the aircraft as modified by the local disturbances at a particular Mach number of the aircraft, said local disturbances being caused by the aircraft displacing the air mass in the vicinity of said multi-orifice pressure head, means for determining the Mach number of the aircraft, computing means coupled to both said multi-orifice pressure head and said means for determining the Mach number of the aircraft for applying a correction factor to said multi-orifice pressure head output which is equivalent to the error caused in said multi-orifice pressure head output by the local disturbances at the particular Mach number of the aircraft, and indicating means coupled to said computing means for indicating the true angles of attack and yaw of the aircraft.

4. A device for indicating the true angles of attack and yaw of an aircraft having predetermined aerodynamic characteristics and flying at a certain Mach number comprising a pressure sensing head affixed to said aircraft for producing a mechanical output which is equivalent to the true angles of attack and yaw of the aircraft as modified by the local disturbances in the vicinity of said pressure sensing head, said local disturbances being caused by the aircraft displacing the air mass in the vicinity of the pressure sensing head, means for transducing said mechanical output to an electrical signal, means for producing an output proportional to the Mach number of the aircraft, computing means coupled to both said transducing means and to said means for producing an output proportional to the Mach number of the aircraft for applying a correction factor to said electrical signal from said transducing means which is equivalent to the error caused in said pressure sensing head output by the local disturbances at the particular Mach number of the aircraft, and indicating means coupled to said computing means for indicating the true angles of attack and yaw of the aircraft.

5. A system for indicating the true angles of attack and yaw of an aircraft having predetermined aerodynamic characteristics comprising pressure sensing means adapted to be mounted on said aircraft for producing electrical signals which are proportional to the angles of attack and yaw and the indicated dynamic pressure of the aircraft, said signals differing from those representing the true angles of attack and yaw and the indicated dynamic pressure of the aircraft by an amount which is dependent on the local disturbances in the vicinity of the pressure sensing head at a particular Mach number of the aircraft, said local disturbances being caused by the aircraft displacing the air mass in the vicinity of the pressure sensing head, quotient computer means coupled to said pressure sensing means for producing outputs which are proportional to the angle of attack signal and the yaw signal, each divided by the dynamic pressure signal, means for producing an output which is proportional to the Mach number of the aircraft, computing means coupled to said last mentioned means and to said quotient computer means for applying a correction factor to said quotients obtained from said quotient computer means, and indicating means coupled to said computer means for indicating the true angles of attack and yaw of the aircraft.

References Cited in the file of this patent

UNITED STATES PATENTS

| | | |
|---|---|---|
| 2,415,529 | Kellogg | Feb. 11, 1947 |
| 2,424,511 | Stanley | July 22, 1947 |
| 2,562,186 | Hallman | July 31, 1951 |
| 2,660,056 | Shuck et al. | Nov. 24, 1953 |

UNITED STATES PATENT OFFICE
Certificate of Correction

Patent No. 2,761,315                                                        September 4, 1956

Niels Y. Anderson, Jr., et al.

It is hereby certified that error appears in the printed specification of the above numbered patent requiring correction and that the said Letters Patent should read as corrected below.

Column 2, line 33, for "position $\alpha$, 4" read —position $\alpha$, $\psi$—; line 57, after "attack" insert a one em dash.

Signed and sealed this 1st day of April 1958.

[SEAL]

Attest:
KARL H. AXLINE,
*Attesting Officer,*

ROBERT C. WATSON,
*Commissioner of Patents.*